US007922260B2

(12) United States Patent
Rodrigues

(10) Patent No.: US 7,922,260 B2
(45) Date of Patent: Apr. 12, 2011

(54) WHEEL AND WHEEL DISK

(75) Inventor: Flavio Rodrigues, Limeira-Sao Paulo (BR)

(73) Assignee: Meritor Comercio E Industria De Sistemas Automotivos Ltda., Sao Paulo (BR)

( * ) Notice: Subject to any disclaimer, the term of this patent is extended or adjusted under 35 U.S.C. 154(b) by 183 days.

(21) Appl. No.: 11/757,540

(22) Filed: Jun. 4, 2007

(65) Prior Publication Data

US 2007/0278850 A1 Dec. 6, 2007

(30) Foreign Application Priority Data

Jun. 5, 2006 (BR) ..................................... 0602148

(51) Int. Cl.
*B60B 23/00* (2006.01)
(52) U.S. Cl. .......... 301/63.101; 301/63.103; 301/95.101
(58) Field of Classification Search ..................... 301/62, 301/63.101, 63.103, 63.104, 64.101, 95.102, 301/5.24, 95.101; 152/427, 428
See application file for complete search history.

(56) References Cited

U.S. PATENT DOCUMENTS

| | | | | | |
|---|---|---|---|---|---|
| 1,470,626 | A | * | 10/1923 | Kranz | 301/63.101 |
| 1,604,596 | A | * | 10/1926 | Odenkirk | 301/11.1 |
| 1,652,214 | A | * | 12/1927 | Putnam | 188/194 |
| 1,664,765 | A | * | 4/1928 | Ash | 301/6.6 |
| 1,890,546 | A | * | 12/1932 | Michelin | 301/64.101 |
| 2,054,965 | A | * | 9/1936 | Clo | 152/427 |
| 2,123,130 | A | * | 7/1938 | Zerk | 301/35.59 |
| 2,608,235 | A | * | 8/1952 | Wyman | 152/340.1 |
| 3,143,377 | A | * | 8/1964 | Mackusick et al. | 301/63.104 |
| 3,827,756 | A | * | 8/1974 | Mitchell | 301/37.43 |
| 4,610,482 | A | * | 9/1986 | Overbeck et al. | 301/63.105 |
| 4,724,880 | A | * | 2/1988 | Voornas | 152/427 |
| 5,219,441 | A | * | 6/1993 | Utykanski et al. | 301/63.106 |
| 5,544,945 | A | * | 8/1996 | Daudi | 301/64.101 |
| 5,772,288 | A | * | 6/1998 | Cvijanovic | 301/63.105 |
| 5,788,334 | A | * | 8/1998 | Renard | 301/5.24 |
| 5,832,609 | A | | 11/1998 | Jansen | |
| 5,899,538 | A | | 5/1999 | Tatraux-Paro | |
| 5,918,947 | A | | 7/1999 | Stach | |
| 6,332,653 | B1 | | 12/2001 | Shimizu | |
| 6,629,736 | B2 | | 10/2003 | Coleman | |
| 6,754,957 | B2 | | 6/2004 | Coleman | |
| 6,913,323 | B2 | | 7/2005 | Bhambra | |
| 6,935,704 | B2 | * | 8/2005 | Guimard et al. | 301/63.101 |
| 7,018,000 | B2 | | 3/2006 | Alff | |
| 7,059,685 | B2 | | 6/2006 | Kermelk | |
| 7,104,611 | B2 | | 9/2006 | Alff | |
| 7,469,973 | B2 | * | 12/2008 | Coleman et al. | 301/63.107 |

* cited by examiner

*Primary Examiner* — Russell D Stormer
(74) *Attorney, Agent, or Firm* — Alston & Bird LLP

(57) ABSTRACT

A wheel assembly includes a wheel rim and a wheel disk that attaches to the wheel rim. The wheel rim includes an inner region for receiving a wheel hub and defines a rotational axis. The wheel disk includes a section for attachment to the wheel hub and an attachment flange for securing the wheel disk and the wheel rim together. The attachment flange includes a first side corresponding to the inner region and a second side corresponding to the wheel rim, where the attachment flange extends from the section in a direction that is transverse to the rotational axis.

7 Claims, 6 Drawing Sheets

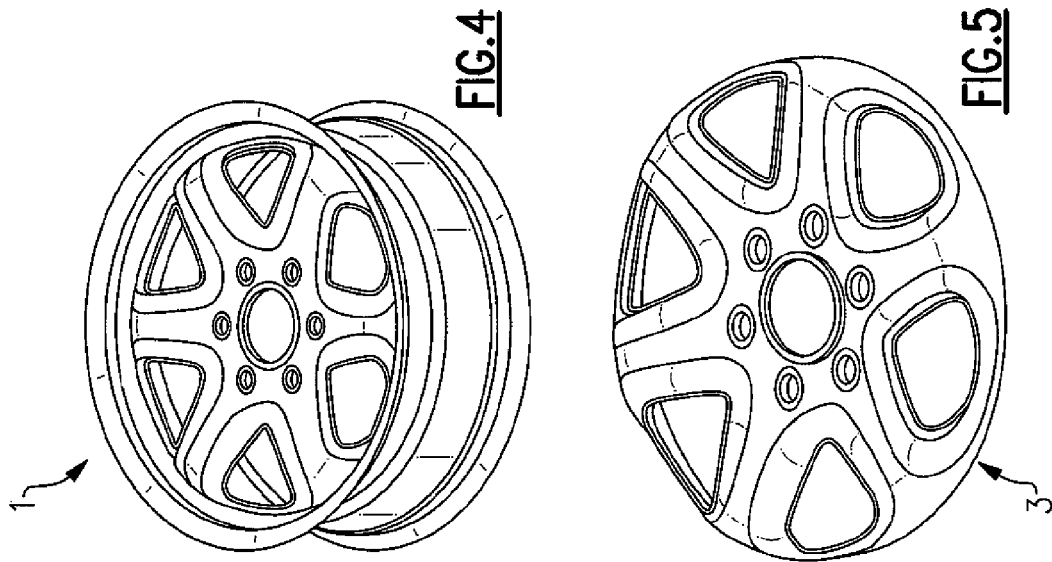
FIG.4
FIG.5
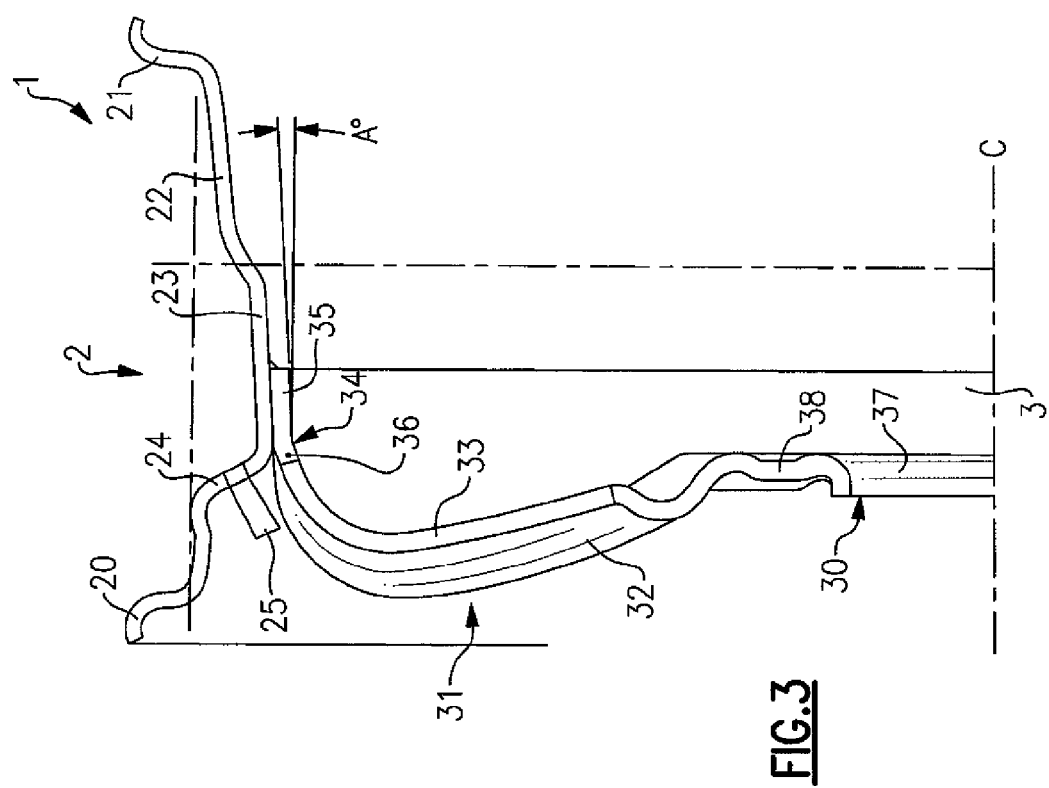
FIG.3

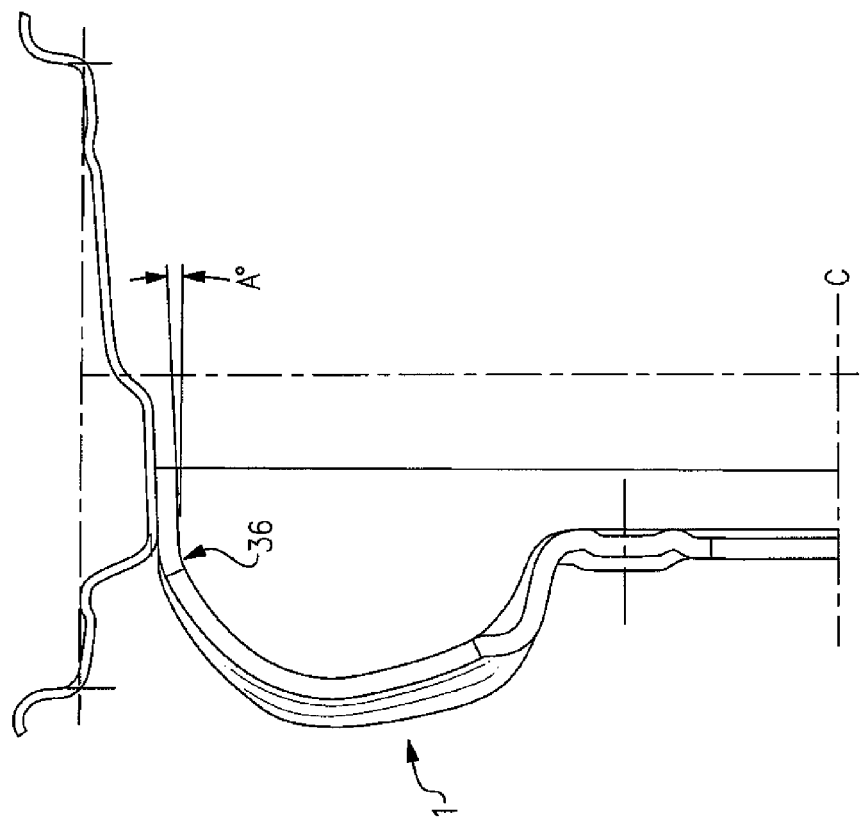
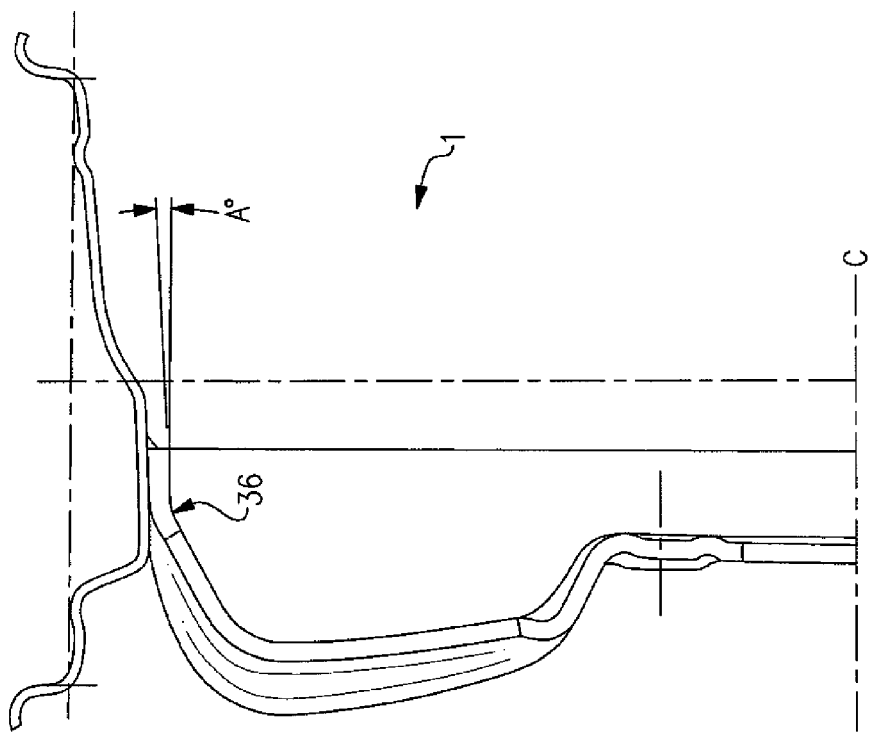

ial. The wheel 1 includes a
WHEEL AND WHEEL DISK

RELATED APPLICATIONS

This application claims priority to Brazilian Application No. BR PI 0602148-4, which was filed on Jun. 5, 2006.

BACKGROUND OF THE INVENTION

This invention refers to a stamped wheel and, more particularly, to a wheel having a wheel disk that provides an attractive appearance, economic manufacturing cost, and convenient tire valve access.

Stamped wheels are known and used in automotive vehicles for low manufacturing cost, satisfactory performance and reparability. Generally, stamped wheels have the drawback of poor visual attractiveness, especially in comparison to single-piece cast wheels formed from light metal alloys (generally known as "aluminum wheels" or "light alloy wheels").

Conventional stamped wheels typically include a wheel rim and a wheel disk that are welded together. The wheel rim and disk are typically stamped from carbon steel, which provides a low cost, desirable handling, and desirable mechanical properties.

The wheel disk typically includes a central region having screw-fastening holes for attachment to a wheel hub, an intermediate region having ventilation windows and spokes, and an external region that attaches to the wheel rim. Typically, a periphery of the external region that attaches to the wheel rim is perpendicular to a plane defined by the wheel disk (i.e., parallel to a rotational axis of the wheel).

The wheel rim includes two external regions (i.e., axial end portions) having flanges and an intermediate region. The intermediate region is typically referred to as a bed or ring-shaped shoulder. The intermediate region defines an internal surface that faces toward the wheel hub and an external surface that faces toward a tire on the wheel rim. The wheel rim may also include a hole for accommodating a tire valve that extends from the tire for gauging.

There are several conventional arrangements of the wheel disk, the wheel rim, and the hole/tire valve. The arrangements each provide a different appearance and have associated drawbacks.

For example, in one arrangement, the periphery of the wheel disk is attached with the inner surface of the external region of the wheel rim. In this arrangement, the hole for the tire valve extends through one of the inclined walls of the bed of the wheel rim. The tire valve protrudes from within the wheel through one of the ventilation windows of the wheel disk to provide access for gauging. Typically, the ventilation window includes a slot to receive the tire valve. This type of arrangement is visually attractive; however, the slot adds an additional step to the manufacturing of the wheel disk. The additional step may increase manufacturing expense, and the slot presents a wheel asymmetry that may cause wheel imbalance.

In a second arrangement, the periphery of the wheel disk is attached with the bed of the wheel rim. The hole for the tire valve extends through one of the inclined walls of the bed such that the tire valve protrudes from the wheel rim outside of the wheel disk. In such an arrangement, the tire valve protrudes at least partially into one of the ventilation windows, which makes tire gauging difficult because the sides of the ventilation window obstruct access. Although this arrangement avoids the manufacturing expense associated with a slotted ventilation window, the appearance is generally undesirable.

Accordingly, a stamped wheel is needed that provides an attractive appearance, relatively economic manufacturing, and convenient tire gauging.

SUMMARY OF THE INVENTION

An example wheel assembly includes a wheel rim and a wheel disk that attaches to the wheel rim. The wheel rim includes an inner region for receiving a wheel hub and defines a rotational axis. The wheel disk includes a section for attachment to the wheel hub and an attachment flange for securing the wheel disk and the wheel rim together. The attachment flange includes a first side corresponding to the inner region and a second side corresponding to the wheel rim, where the attachment flange extends from the section in a direction that is transverse to the rotational axis.

In another aspect, the wheel disk includes a section for attachment to the wheel hub and an attachment flange for securing the wheel disk and the wheel rim together. The attachment flange extends from the section toward the inner region in a direction that is transverse to the rotational axis.

An example method for providing a desirable tire valve position relative to the wheel assembly includes forming the attachment flange on the wheel disk such that the attachment flange extends from the section of the wheel disk in a direction that is transverse to the rotational axis of the wheel assembly, and securing the attachment flange and the wheel rim together such that a tire valve region associated with a valve opening for receiving the tire valve is non-intersecting with any ventilation openings of the wheel disk.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 3 is a cross-section of a third example wheel.
FIG. 4 is a perspective view of the third example wheel.
FIG. 5 is a perspective view of a wheel disk of the third example wheel.
FIG. 9 is a cross-section of a fifth example wheel.
FIG. 10 is a cross-section of a sixth example wheel.

DETAILED DESCRIPTION OF THE PREFERRED EMBODIMENT

FIGS. 1, 2, 4, and 7 illustrate embodiments of a wheel 1 that may be used in automotive vehicles, such as automobiles, light commercial vehicles, trucks, buses, non-motorized vehicles, trailers, or other vehicles. The wheel 1 includes a wheel rim 2 that attaches to a wheel disk 3 to form the wheel 1. In this example, the wheel rim 2 and wheel disk 3 are stamped from carbon steel, although other types of steel or alloys may be used. The wheel 1 defines an imaginary axial center line "C" corresponding to a rotational axis of the wheel 1. The center line C can be defined the wheel 1, by the wheel rim 2, or the wheel disk 3, and is identical in all of the three situations.

Figure 1:
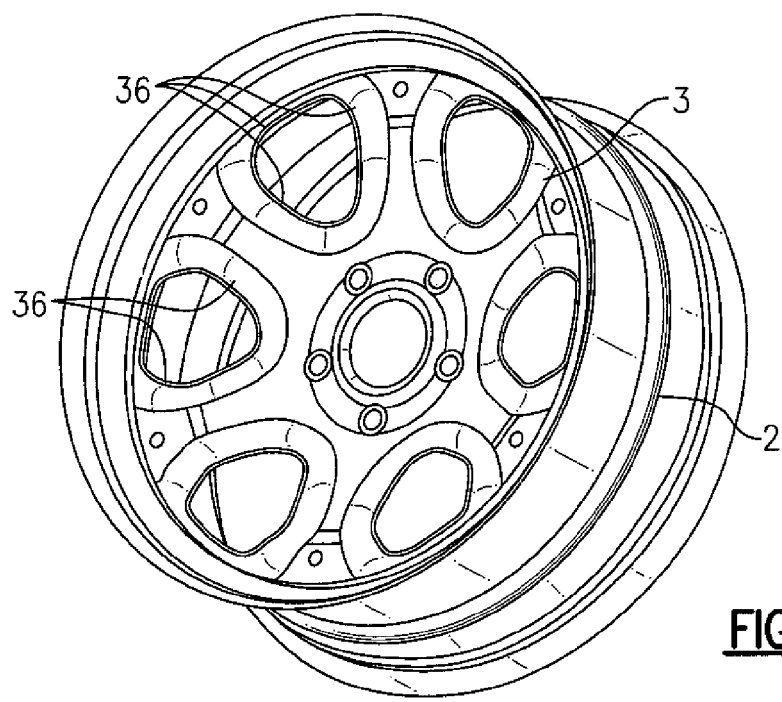
FIG. 1 is a perspective view of an example wheel.
Figure 2:
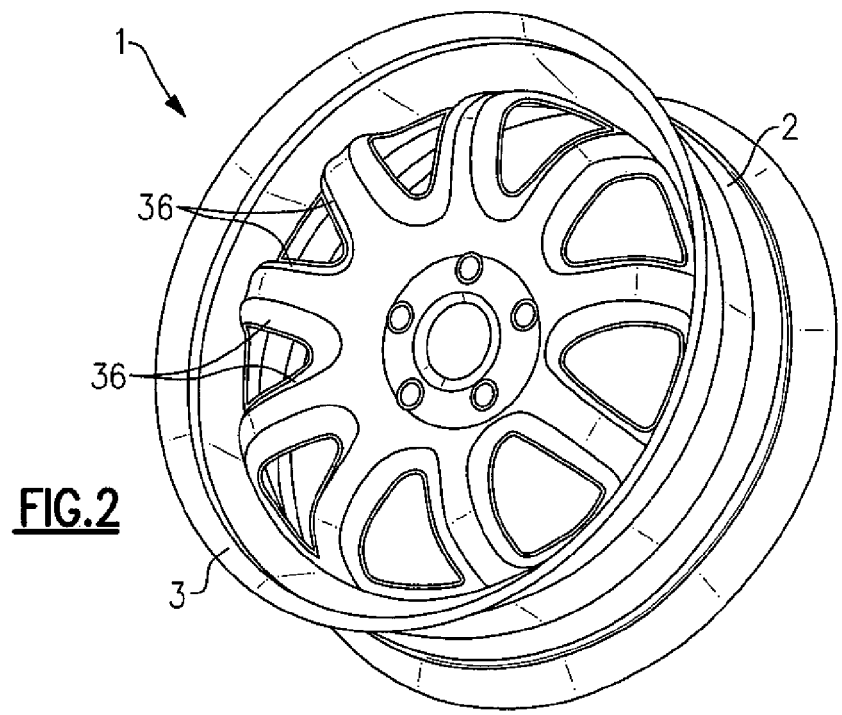
FIG. 2 is a perspective view of a second example wheel.
Figure 7:
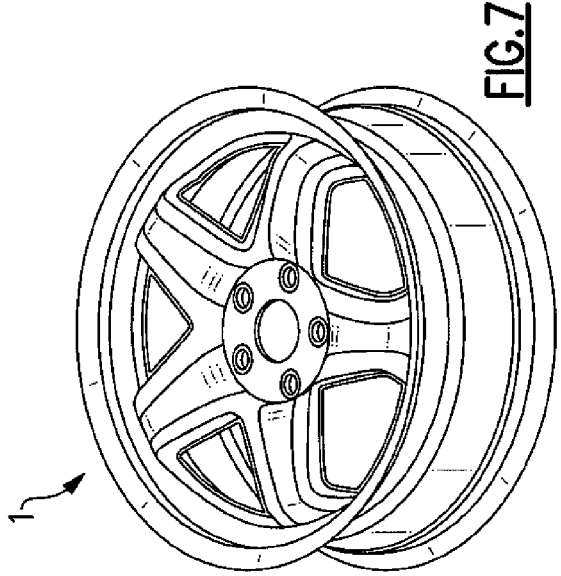
FIG. 7 is a perspective view of the fourth example wheel.
Figure 8:
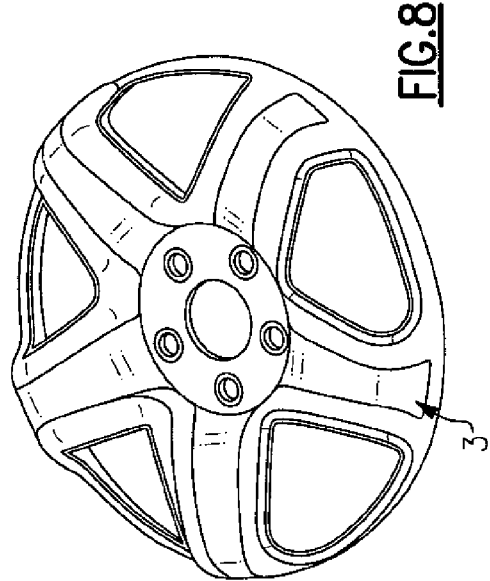
FIG. 8 is a perspective view of a wheel disk of the fourth example wheel.
Figure 6:
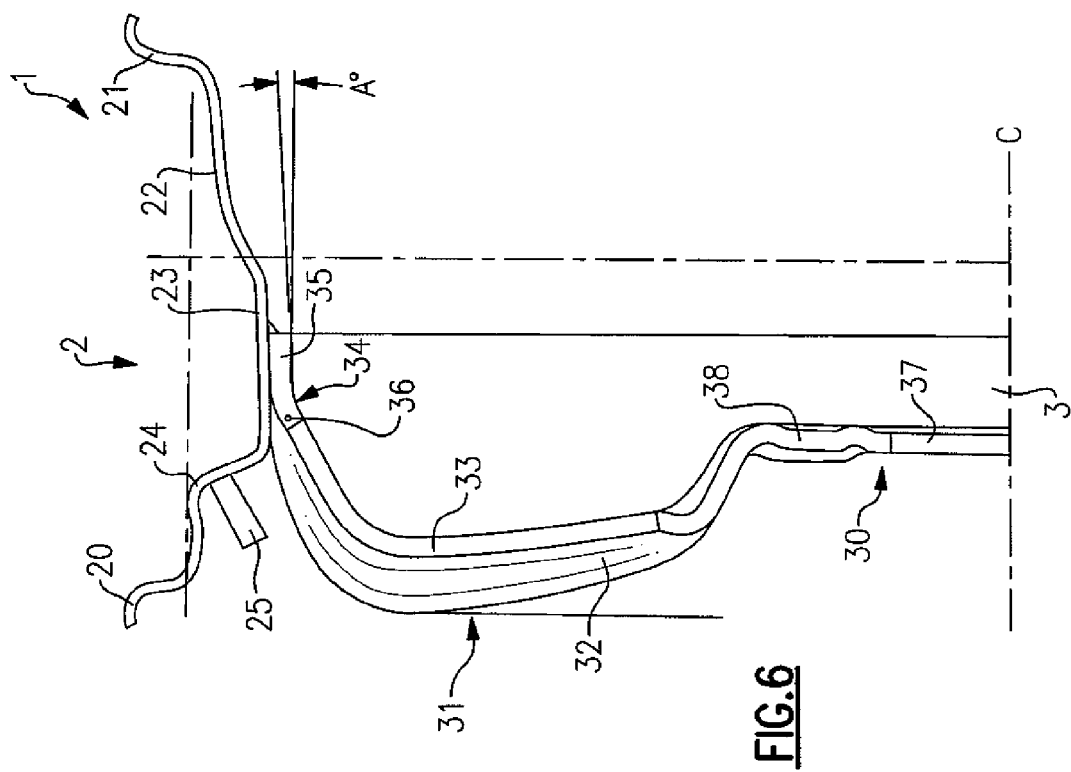
FIG. 6 is a cross-section of a fourth example wheel.

Referring also to the example wheels 1 shown in FIGS. 3 and 6, the wheel rim 2 is substantially cylindrical and defines an internal surface facing in a direction toward an inner region of the cylinder that receives a wheel hub. The wheel rim 2 includes a first external portion 20 (e.g., a first flange) and a second portion 21 (e.g., a second flange), where the first and second flanges are associated with an intermediate portion 22 having at least one bed-shaped shoulder 23.

The wheel rim 2 also includes a ramp portion 24 adjacent the bed-shaped shoulder 23. The ramp portion 24 includes at least one hole for receiving a tire valve 25 for filling at a tire associated with the wheel 1. As can appreciated in FIGS. 3, 6, 9, and 10, the ramp portion 24 forms a side wall of the bed-shaped shoulder 23 and generally extends in a direction toward the first external portion 20. The ramp portion 24 includes a protrusion projecting beyond the adjacent portions of the rim (i.e., a discrete ring-shaped protrusion).

The hole for receiving a tire valve 25 extends through the ramp portion 24. The positioning of the hole relative to the wheel rim 2 and wheel disk 3 provides the benefit of convenient access to the tire valve 25 without obstruction from the wheel disk 3.

The bottom surface of bed-shaped shoulder 23 of the intermediate portion 22 is sloped at an angle "A°" relative to the center line C of wheel 1.

The tire (not shown) is positioned on the wheel rim 2 within the first and second flanges. Air pressure inside the tire forces its walls (called tire beads) against flanges, thereby holding it in position.

The wheel disk 3 includes a first portion 30 (e.g., a circular section) for fastening to a wheel hub of a vehicle. A second, intermediate portion 31 extends from the end of the first portion 30 and is concentric with the first portion 30. The intermediate portion 31 includes spokes 32 that define ventilation windows or openings 33. A third portion 34 extends from the intermediate portion 31 and is concentric therewith. The third portion 34 includes a circular peripheral flange 35 for attachment with the wheel rim 2.

Each ventilation window 33, if it is not perfectly circular, includes an external edge 33' defined by the circular peripheral flange 35 and at least two side edges 33" defined by the spokes 32. The sides that form the ventilation windows 33 are sloped. That is, each spoke 32 includes a central surface between two of the ventilation windows 33, and a fillet 36 that slopes from the central surface to the edges 33" of the ventilation windows 33. In one example, the fillet 36 is a substantially flat surface. The fillet 36 provides the benefit of enabling a desirable finish around the ventilation windows 33. For example, after stamping the wheel disk 3, the fillet 36 is machined and the corners are rounded to provide an increase in mechanical strength and torsional stiffness.

Figure 12A:
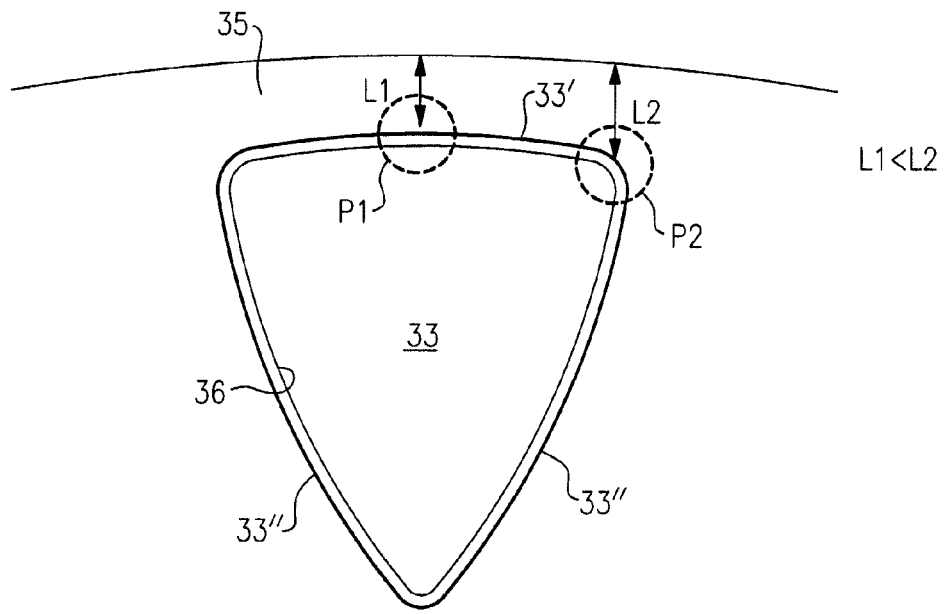
FIG. 12A is a schematic view of a ventilation window of an example wheel and FIG. 12B is a similar view of a ventilation window of a prior art wheel.
Figure 12B:
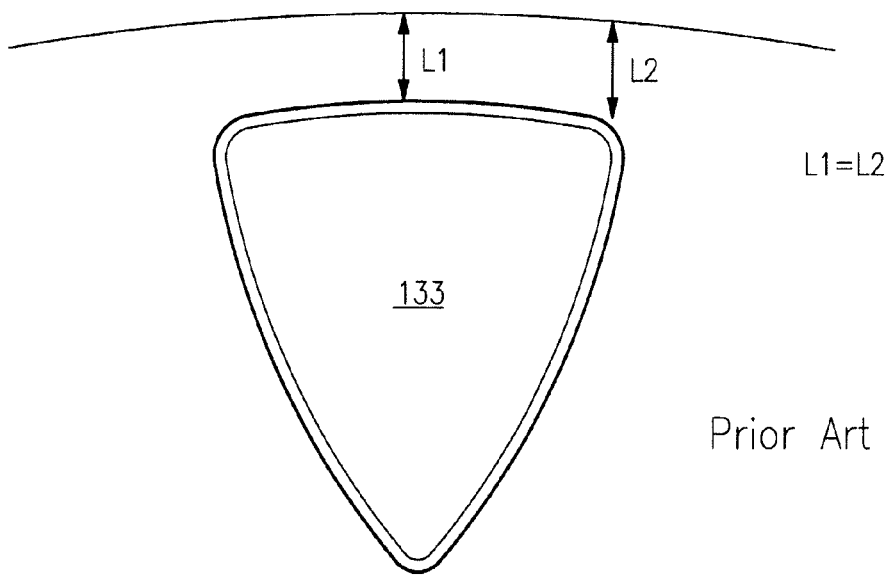

The circular peripheral flange 35 defines the external edge 33' of the ventilation window 33. In the disclosed examples, the external edge 33' is non-linear relative to the circular peripheral flange 35. That is, the circular peripheral flange 35 varies in width such that in an intermediate portion P1 of edge 33', the circular peripheral flange 35 has a first width L1 less than a second width L2 at an extreme portion P2 of the external edge 33' (FIG. 12A). Each non-linear external edge 33' provides a smooth curvature or angle towards adjacent external edges 33', which reduces stress accumulation.

The circular peripheral flange 35 extends at an angle A° relative to the center line C and corresponds to the angle of the bed-shaped shoulder 23 to increase contact between the circular peripheral flange 35 and the inner surface of the bed-shaped shoulder 23. In combination with the fillet 36, the angle A° of the circular peripheral flange 35 increases mechanical strength and torsional stiffness of the wheel 1.

In the illustrated examples, the wheel disk 3 also includes a central hole 37 for positioning of a vehicle shaft end and three through holes 38 circularly and concentrically arranged for positioning of wheel screws/studs (not shown) for fastening the wheel 1 to a vehicle wheel hub.

The wheel rim 2 and the wheel disk 3 are secured together using the third portion 34 of the wheel disk 3 and the bed-shaped shoulder 23 of the wheel rim 2. For example, a solder fillet is used to bond the wheel rim 2 and the wheel disk 3 together.

Figure 11:
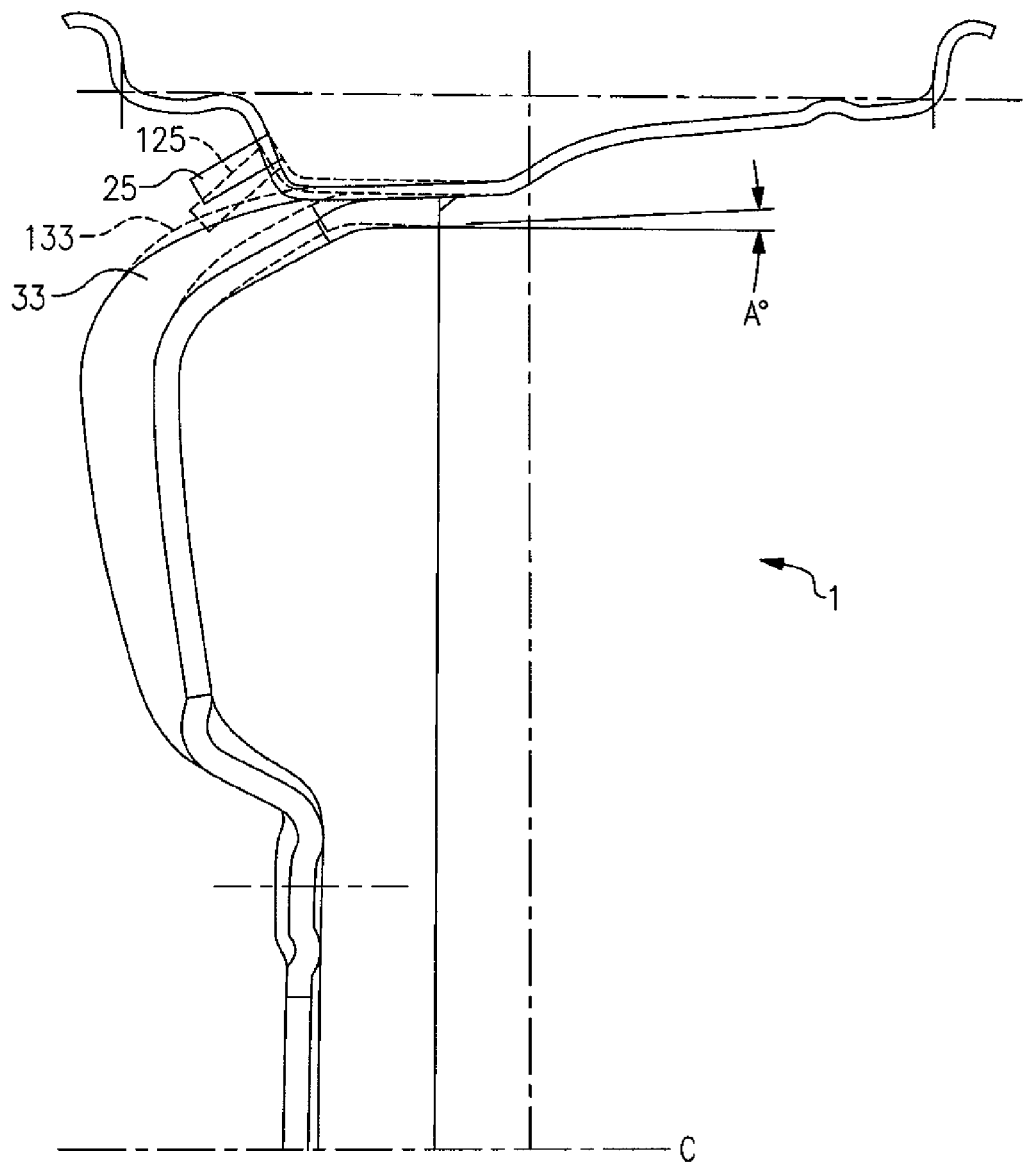
FIG. 11 is a cross-section of an example wheel compared with a prior art wheel.

FIG. 11 illustrates a conventional wheel (dotted lines) and a disclosed wheel (solid lines) utilizing the angled wheel disk 3 and angled bed-shaped shoulder 23. For the conventional wheel, a tire valve 125 intersects a ventilation window 133, which obstructs access to the tire valve. However, the angle A° of the circular peripheral flange 35 of the disclosed wheel 1 orients a zone where the tire valve 25 is located such that the tire valve 25 does not intersect the ventilation window 33. Thus, the angle A° provides the benefit of allowing access to the tire valve 25 without obstruction from the wheel disk 3 and without requiring additional manufacturing steps.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A wheel assembly comprising:
   a wheel rim having an internal surface facing a wheel rotational axis, the wheel rim comprising at least a first external portion in the form of a first flange at an outer side of the wheel rim and at least a second portion in the form of a second flange at an opposite inner side of the wheel rim, the first and second flanges being associated to an intermediate portion provided with at least one bed-shaped shoulder having a disk-contacting surface an entire length of which is sloped at a positive non-zero angle relative to the wheel rotational axis such that the entire length of the disk-contacting surface continuously increases in diameter in a direction from the outer side to the inner side of the wheel rim; and
   a wheel disk having a first portion to be attached to a wheel hub, a second portion including a plurality of spokes that define ventilation windows, and a third portion including a circular peripheral flange having a rim-contacting surface in contact with the disk-contacting surface of the wheel rim, the circular peripheral flange having a width, an entire length of the rim-contacting surface of the circular peripheral flange extending at a positive angle relative to the wheel rotational axis that corresponds to the angle of the disk-contacting surface of the bed-shaped shoulder relative to the wheel rotational axis, and wherein the ventilation windows comprise non-circular openings with an external edge defined by the circular peripheral flange and at least two side edges defined by adjacent spokes wherein each spoke includes a central surface between two adjacent ventilation windows and fillets that slope from the central surface to respective side edges of the adjacent ventilation windows, the wheel disk and the wheel rim being associated with each other by the association between the peripheral circular flange of the disk and the bed-shaped shoulder of the intermediate portion of the rim.

2. The wheel assembly according to claim 1 wherein the external edge has an intermediate portion and an extreme portion at one end of the external edge, and wherein the width of the circular peripheral flange at the intermediate portion is less than the width of the circular peripheral flange at the extreme portion.

3. The wheel assembly according to claim 1 wherein the fillets are substantially flat surfaces.

4. The wheel assembly according to claim 1 wherein the angle orients a zone in the wheel rim for a tire valve such that the tire valve does not intersect a ventilation window.

5. The wheel assembly according to claim 1 wherein the wheel rim comprises a stamped component.

6. The wheel assembly according to claim 1 wherein the wheel disk comprises a stamped component.

7. The wheel assembly according to claim 1 wherein the wheel disk and wheel rim are attached to each other with a solder fillet.

* * * * *